United States Patent [19]

Bradfute

[11] Patent Number: 5,445,333
[45] Date of Patent: Aug. 29, 1995

[54] ARMATURE WINDING METHOD AND APPARATUS

[75] Inventor: John W. Bradfute, Xenia, Ohio

[73] Assignee: Globe Products Inc., Huber Heights, Ohio

[21] Appl. No.: 51,022

[22] Filed: Apr. 21, 1993

[51] Int. Cl.⁶ .................. H02K 15/04; B23P 19/00
[52] U.S. Cl. .................. 242/7.05 B; 29/596; 29/735
[58] Field of Search .......... 242/7.05 R, 7.05 A, 242/7.05 B, 7.05 C; 29/596, 597, 598, 735, 564.5

[56] References Cited

U.S. PATENT DOCUMENTS

5,369,877 12/1994 Lombardi et al. .

*Primary Examiner*—Daniel P. Stodola
*Assistant Examiner*—Michael R. Mansen
*Attorney, Agent, or Firm*—Roger S. Dybvig

[57] ABSTRACT

In the winding of an armature having a slotted commutator by a flier-type armature winding machine, a finish wire is severed closely adjacent its associated commutator bar slot by clamping a segment of the finish wire to a fixed tooling piece after it is wedged into the commutator bar slot by a linearly movable clamp rod having a finger which extends into the path that the start wire takes at the beginning of the winding of the next armature. The start wire is, accordingly, looped around the finger at the beginning of the winding of the next armature. The clamp rod is thereafter moved away from the fixed tooling piece, carrying the loop of wire with it. During the latter movement, the loop of wire is stripped from the finger by a cam surface past which the finger moves. The machine is provided with quick change wire guide tooling parts and quick change tamping blades so that the machine may be rapidly retooled for maintenance or for winding armatures having different parameters. The tamping blades move purely linearly through small distances during the tamping operations.

5 Claims, 9 Drawing Sheets

ARMATURE WINDING METHOD AND APPARATUS

CROSS-REFERENCE TO RELATED APPLICATIONS

This is a continuation-in-part of application Ser. No. 07/949,679, filed in the United States Patent and Trademark Office on Aug. 22, 1992, and now abandoned, which was a continuation-in-part of application Ser. No. 07/932,492, filed in the United States Patent and Trademark Office on Aug. 20, 1992, and now abandoned.

BACKGROUND OF THE INVENTION

This invention relates to an armature winding method and apparatus and especially to the winding of armatures for electric motors of the type having an armature core and a commutator mounted in spaced relation on an armature shaft and wherein the commutator comprises a plurality of circumferentially arranged bars provided with coil lead wire-receiving slots. This type of commutator is referred to herein as a "slotted commutator".

The present invention is intended for use in association with flier-type armature winding machines, and particularly double flier armature winding machines. In flier-type armature winding machines, the armature coils are wound from continuous lengths of magnet wire having an insulating coating by rotation of fliers from which the insulated magnet wires extend. Lead wire segments between coils are connected to respective associated commutator bar slots. A coil lead is connected to, or wedged into, a commutator bar slot by a process called "lead stuffing" in which a segment of the lead is aligned with the commutator bar slot by wire guide tooling and staked or tamped therein by operation of a tamping mechanism. The commutator bar slots are narrower than the diameter of the coil leads so that the act of tamping the leads into the slots causes the insulating coating on the wire to be shaved off by the margins of the bar slots and causes the leads to be deformed in the slots and thereby firmly held in place. (As a separate and subsequent manufacturing step, the coil leads are permanently connected to the commutator bars by a hot staking or fusing operation.)

The invention herein is illustrated as practiced with a double flier armature winding machine. Such machines when used for winding armatures having slotted commutators commonly have wire guide tooling mounted on a commutator shield that completely encircles the commutator of an armature being wound, except that the shield is notched or slotted at two locations, which are usually mutually spaced apart by 180 degrees, to expose a pair of commutator bar slots to enable coil leads to be connected thereto. (As will already be known by those familiar with the art, notches or slots in the shield will be spaced apart by more or less than 180 degrees if the machine is set up to wind armatures having an odd number of slots.) As will be appreciated, the invention is equally applicable to single flier machines, in which the shield would have only one notch or slot. In either case, wires are directed into alignment with the shield notches or slots by wire-guiding surfaces of the wire guide tooling.

At the beginning of an armature winding cycle, a segment of the magnet wire, referred to herein as a start wire, leading to the first coil to be wound by a flier is wedged into a first commutator bar slot. At the end of a winding cycle, a finish wire extending from the last coil wound is also wedged into a commutator bar slot over a start wire therein. When using a single flier armature winder, all of the coils are wound from a single strand of wire, and the single finish lead is wedged into the same slot as the single start lead. In double flier armature winding machines having two fliers, there are two start and two finish wires. The finish wire generated by one of the fliers is placed over the start wire generated by other of the two fliers, and vice versa.

Leads between successively wound coils are tamped one above the other into their respective commutator slots. Thus, the wire leading to a flier from the last turn of one coil is aligned with or placed in a commutator slot by appropriate rotation of the flier, such lead usually then being tamped therein. The wire segment leading to the flier from the commutator slot is usually then bent or looped on itself, by further movements of the flier, aligned with or placed into the same slot, and tamped therein. The loops formed in the wire segments between the two leads become wasted wire which usually must be removed from the commutator by a subsequent processing operation. These loops are preferably quite small in order to minimize the amount of wasted wire and to simplify or eliminate the need to remove the excess wire forming the looped portions. However, with existing machines, the loops are usually larger than desirable. The amount of excess wire becomes significant when taking into account that there are wasted wire segments between each pair of wound coils and the great number of armatures that are manufactured each year.

When winding an armature, the winding of the armature coils and the connection of the lead wires to the commutator bars takes place while the armature is held by a chuck or collet clamp at a winding station and properly positioned with respect to the fliers. The chuck or collet clamp is rotatable so that the armature can be rotated or indexed as needed to place successive pairs of armature core slots in position to receive coils wound by the fliers and to locate the appropriate commutator bar slots in position to receive wire leads.

Between the winding of successively wound armatures, the magnet wire segments leading from the finish wires of the newly wound armature are usually gripped by wire clamps and the short segments of wire between the finish wires and the clamps are severed so that the wound armature is cut free from the wire segments leading to the fliers. The wound armature is then removed from the winding station and replaced by an unwound armature and, while the wire clamps retain their grip on the wire segments leading to the fliers, the start wires are tamped into wire lead-receiving slots of the unwound armature. At that time, or shortly thereafter, the clamped wire segments are cut free from the start wires of the armature now located in the winding station. The processes for cutting the clamped wire segments free from the finish and start wires are known as "lead trimming" or "lead cutting".

In a lead trimming or cutting method that has been used successfully, a finish wire is severed closely adjacent its associated commutator bar slot by clamping the finish wire after it is wedged into the appropriate bar slot, and then by rotating the armature to bend the finish wire about an edge of the commutator that partly defines the slot in which it is wedged. As a result, the finish wire is subjected to a high concentration of stress at the edge of the commutator bar slot and ultimately breaks at that edge. The wire leading to the flier remains clamped while the newly wound armature is removed from the winding machine and replaced by the next unwound armature. After the usual index to properly locate a slot of the unwound armature in position to receive a wire lead, the flier is rotated and the tamping mechanism operated to wedge a start wire into a commutator bar slot. Rotation of the flier mechanism is interrupted and the armature again rotated so that the clamped portion of the wire is stretched and severed adjacent the start wire slot.

Although prior flier-type machines used for winding armatures having slotted commutators in accordance with the methods described in the preceding paragraph are generally satisfactory, they have certain drawbacks. For one, the known wire clamp mechanisms and clamping methods are typically relatively complex and expensive. In addition, the prior machines have relatively complex assemblies or mechanisms for guiding and tamping the wires into the commutator bar slots. These are difficult to retool and set up properly when there is a change in the construction of the armatures to be wound. Moreover, the existing tamping mechanisms can be difficult to adjust and may require frequent readjustment.

SUMMARY OF THE INVENTION

Among the objects of the present invention are to provide an improved method and apparatus for winding armatures having slotted commutators and, in particular, to improved methods and apparatus for connecting the lead wires between coils to a slotted commutator, for connecting the start and finish wires to the slotted commutator, and for handling and trimming the wire segments between the start and finish wires of successively wound armatures.

An armature winding machine in accordance with one aspect of this invention includes a linearly movable clamp rod that pinches the finish wire to the wire guide tooling. To minimize the lengths of wire cut away during the winding process, the wire guide tooling is preferably constructed to permit entry of the clamp rod into the tooling close to the slotted portion of the commutator. A finger is carried by the clamp rod around which the clamped end of the wire is looped when the winding of an armature is commenced. Upon subsequent retraction of the clamp after the start wire is severed, the looped wire remnant engages a cam surface and falls off the finger so that it can be discarded.

Wires used to form the windings with the use of flier-type armature winders are supplied to the flier spindles through tensioning devices that include a wire take-up device, often comprising a spring-biased dancer arm. In accordance with this invention, the wire take-up device is used in cooperation with the movements of a flier to reduce the size of the bent wire loop formed in lead wire connections to the commutator bars. After the winding of a coil with the flier rotating in a forward direction, the flier is reversed, as is conventional, to a reverse stop position to extend a wire segment, which is the finish wire of the coil just wound, into alignment with a commutator bar slot, and the tamping mechanism tamps that wire segment into the slot. The flier is then rotated forwardly sufficient to bend the wire segment over the segment tamped in the bottom of the commutator bar slot and to bring it into a position of alignment so that it can be tamped into the top of the same commutator bar slot. The size of the wire loop formed by bending the wire segment over itself can be reduced significantly by a short reverse motion of the flier following the latter forward movement. At the outset of the reverse movement, a slack wire condition is momentarily created, causing the wire take-up device to begin to pull out the slack. The reverse flier movement is then quickly halted so that the momentum of the wire take-up device pulls the wire backward through the flier and reduces the size of the wire loop.

Another object of another aspect of this invention is to provide improved wire guide tooling which is relatively inexpensive, easy to maintain, and quickly and easily modified for accommodating to different armature constructions. In accordance with this aspect of the invention, wire guide tooling is provided that includes parts which can be easily removed and replaced to accommodate a changeover of the armature winder for different armature configurations and also for maintenance or repair. As a further enhancement, to enable rapid replacement for purposes of changeover, the wire guide tooling forms part of a wire guide and clamping assembly which is mounted onto the frame of a rotator assembly affixed to the main frame of machine by fasteners which can be quickly and easily removed and replaced without the use of tools. Accordingly, a motor manufacturer could have two or more sets of complete wire guide and clamping assemblies on hand for purposes of changeover. One set of wire guide and clamping assemblies can be removed and replaced by a second set in a few minutes.

In yet another aspect of this invention, an object is to provide an improved tamping mechanism which is rugged, reliable, and easy to adjust, and which maintains its adjustment for long intervals of use. In accordance with this aspect of the invention, each wire tamping mechanism and its actuator are mounted directly on a support piece which is integral with a wire guide tooling mounting block. The tamping blades are positively guided almost the entire length of their travel toward and away from the commutator bar slots. The travel of the tamping blades is purely linear and through a relatively short stroke, on the order of one half inch or less, so that there is little opportunity for the mechanism to fall out of adjustment.

In a related aspect of this invention, an object is to provide an improved tamping assembly which enables the tamping blades to be quickly and easily removed and replaced for purposes of repair or for changeover to a different wire size. In accordance with this aspect of the invention, each tamping blade is driven along a path of movement to which it is confined by a air actuator which is mounted for movement along a path which is transverse to the path of movement of the tamping blade. A drive fitting, preferably in the form of a clevis pin, on the end of the piston rod extending from the air actuator is slidably engaged with the tamping blade. The tamper air actuator is so mounted on the machine frame that it may be manually retracted from the tamping blade along the transverse path, whereupon the tamping blade is released from the tamper air actuators fitting so that it can be removed by hand. Both drive pistons used with a double flier armature winder are preferably mounted on a single supporting member so that both tamper blades can be quickly removed and replaced at the same time.

Other objects and advantages of this invention will become apparent from the following description and the drawings.

BRIEF DESCRIPTION OF THE DRAWINGS

FIG. 1 is a fragmentary, partially diagrammatic and simplified perspective view, with parts broken away, of a portion of an armature winding machine in accordance with this invention. FIG. 1 shows parts of the machine and also an unwound armature in position to be wound just after the armature has been positioned in the winding station.

FIG. 4 is a fragmentary side elevational view of the machine of FIG. 1 illustrating the parts just before a start wire is tamped into a commutator bar slot.

FIG. 5 is a fragmentary plan view of the machine of FIG. 1, with parts in cross section, taken along line 5—5 of FIG. 4, at the same time during the sequence of operation as FIG. 4.

FIGS. 6, 7, and 8 are views similar to FIG. 4 but illustrating subsequent steps in the operating sequence to complete the tamping of the start wire into a commutator bar slot and rotate the armature into a position in readiness for the winding of the armature.

FIG. 9 is a fragmentary side elevation view of a portion of the machine shown in the preceding figures, and illustrating the disposal of a remnant piece of wire cut from the wire used in winding successive armatures.

FIG. 18 is a fragmentary, partially diagrammatic and simplified perspective view, with parts broken away, of a portion of the armature winding machine of FIG. 1, but viewed from a different direction than FIG. 1 in order to show different parts of the machine. FIG. 18 shows parts of the machine and also an armature that has now been fully wound in position for its finish wires to be clamped to the wire guide tooling.

FIG. 24 is a fragmentary, simplified perspective view of a portion of an armature winding machine in accordance with a second embodiment of this invention. FIG. 24 shows parts of the machine and also a partially wound armature after the tamping into commutator bar slots of the lead wires extending from the finish of the first wound coils.

DETAILED DESCRIPTION

Figures 1, 4, 5, 6:
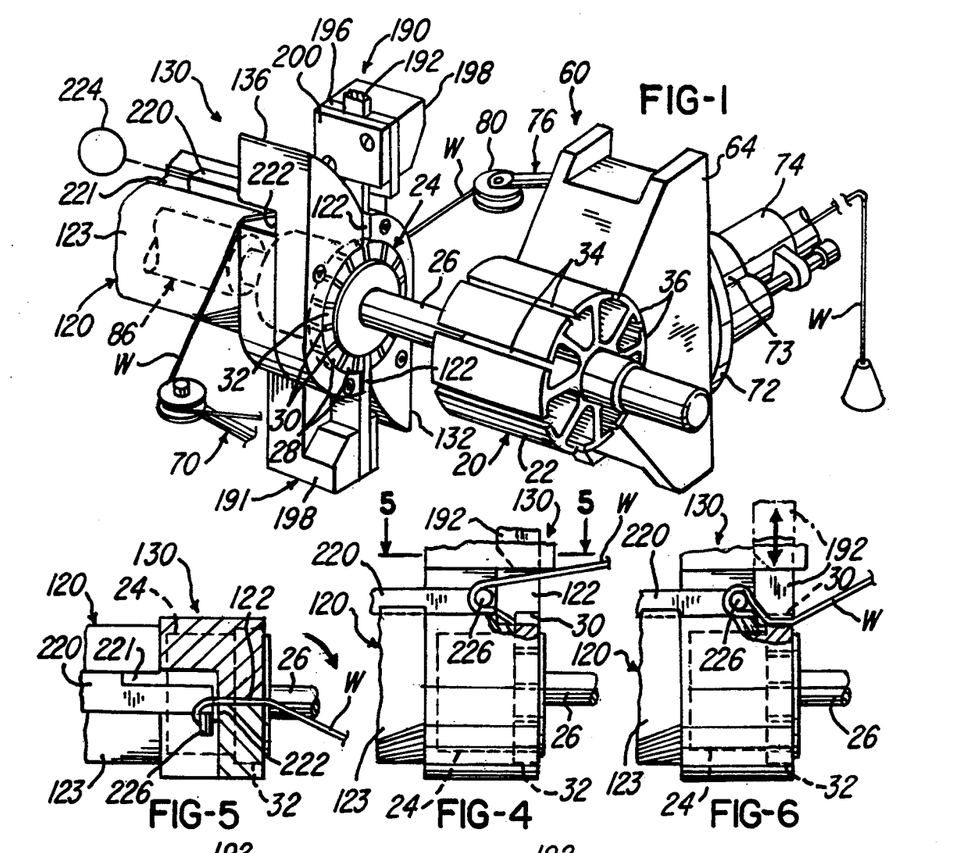

With reference to FIG. 1, this invention is directed to an improved method and apparatus for winding the type of armature, generally designated 20, having a laminated core 22 and a commutator 24 mounted on an armature shaft 26. The commutator 24 has a plurality of circumferentially spaced commutator segments or bars 28 provided with coil lead-receiving slots 30 adjacent one end of the laminated core 22. In the particular armature illustrated in the drawings, the commutator bar slots 30 are in an enlarged diameter portion, designated 32, of the commutator bars 28, which portion is referred to in industry as a "riser". The core 22 has a plurality of radially extending, outwardly opening, coil-receiving slots 34 separated by T-shaped teeth 36 which receive coil windings 38 (FIG. 18).

Figure 18:
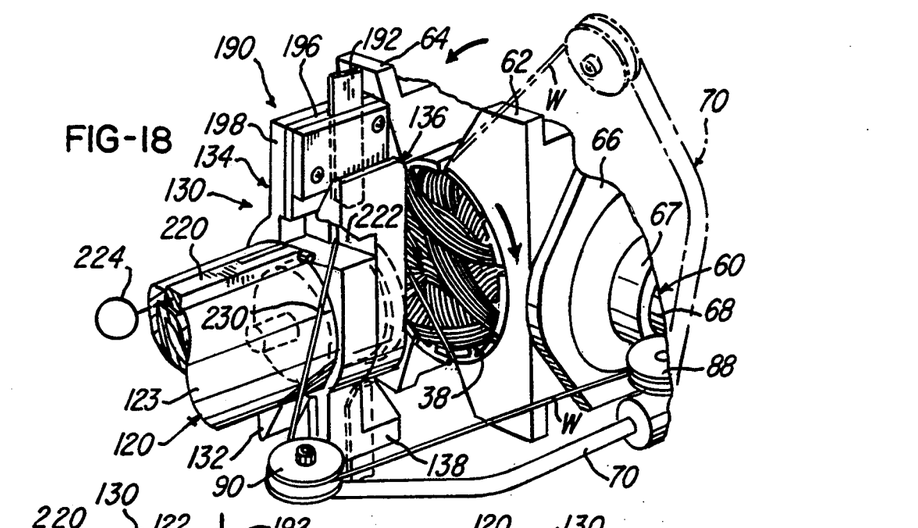

With reference to FIGS. 1 and 18, an armature winding machine in accordance with this invention is generally designated 60 and includes left and right side chucks or winding forms, designated 62 and 64 respectively, that receive the armature 20 between confronting, concavely curved surfaces thereof. The left side winding form 62 is mounted upon a mounting plate 66 mounted by a bearing (not shown) in a bearing housing 67 that rotatably receives a flier spindle 68 on which is affixed a left side flier 70 that is only partly visible in FIG. 1. The right side winding form 64 is similarly mounted upon a mounting plate 72 mounted by a bearing (not shown) in a bearing housing 73 that rotatably receives a flier spindle 74 for a right side flier 76.

Figure 3:
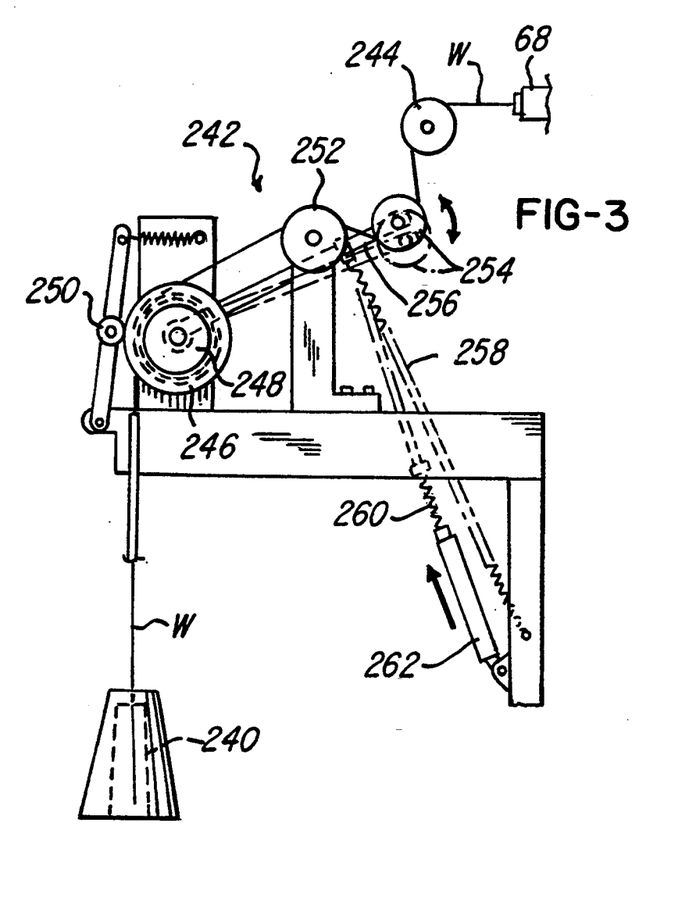
FIG. 3 is a fragmentary side elevational view of a wire de-reeling mechanism in accordance with this invention.

As conventional, and as illustrated in a highly simplified fashion in FIGS. 1, 3, and 18, wire W is de-reeled under tension from a supply spool (not shown) and coursed through the right side spindle 74 around a spindle exit pulley (not shown) mounted for rotation thereon and a flier pulley 80 mounted for rotation at the terminal end of the right side flier 76. Another strand of wire W is drawn under tension from another supply spool (not shown) through the left side spindle 68 and around a spindle exit pulley 88 and a left side flier pulley 90. As well known to those skilled in the art, the spindles 68 and 74 and, accordingly, the fliers 70 and 76, are simultaneously rotatably driven by a spindle drive motor or motors (not shown) for winding coils two at a time in spaced pairs of coil-receiving slots 34.

With continued reference to FIG. 1, during the winding procedure, the end of the armature shaft 26 adjacent to the commutator 24 is gripped by a collet assembly 86, the construction and operation of which may be entirely conventional and form no part of this invention. Descriptions of collet assemblies, such as assembly 86, and their operation are contained in U.S. Pat. No. 4,633,577, issued to Alvin C. Banner on Jan. 6, 1987, and in U.S. Pat. No. 4,915,313, issued to Alvin C. Banner et al on Apr. 10, 1990.

Figures 28, 35, 36, 37:
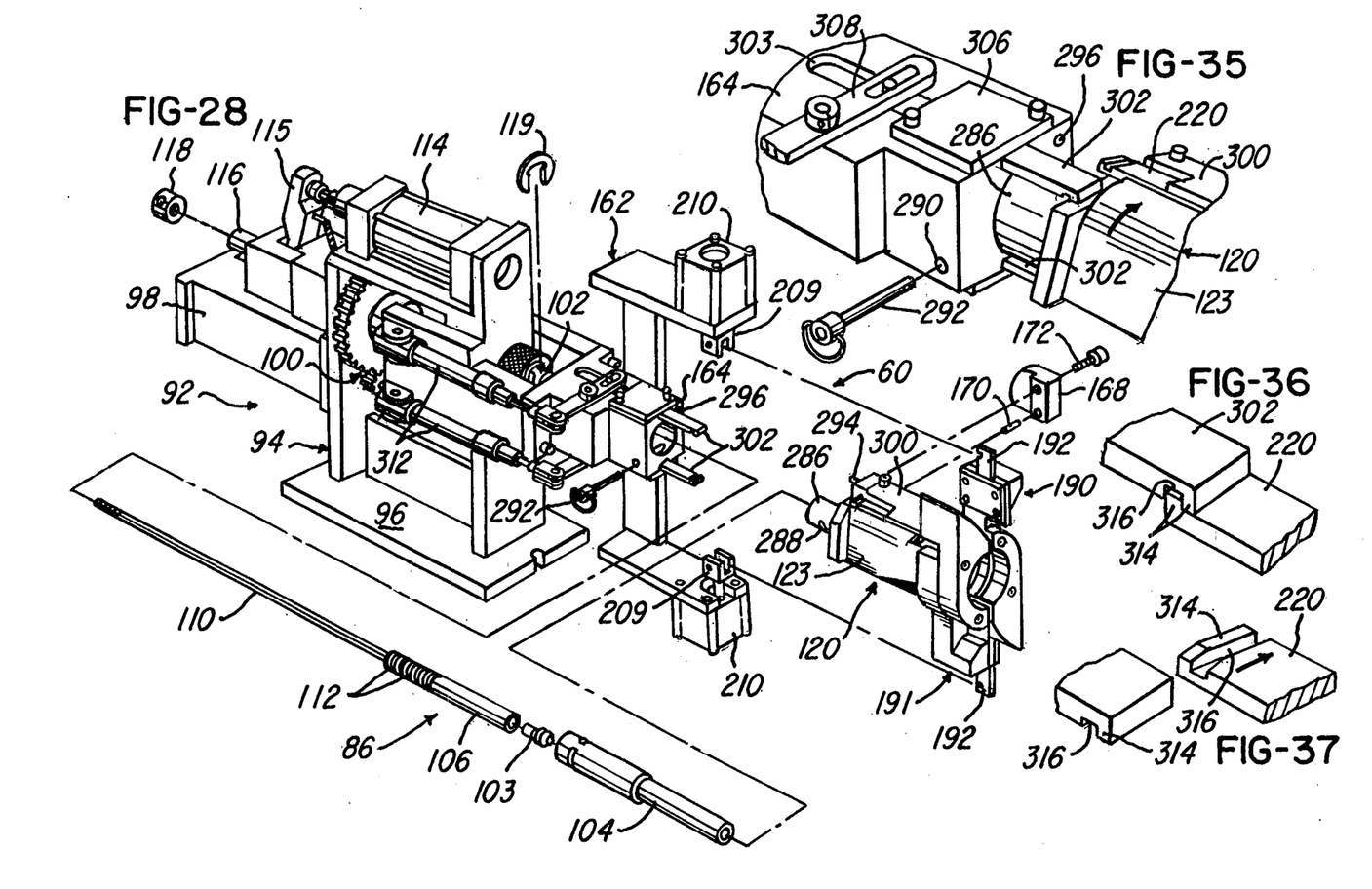
FIG. 28 is a partially exploded perspective view of an armature rotator assembly and a wire guide and clamping assembly embodying the apparatus of this invention.
FIG. 35 is a fragmentary perspective view of part of the same portion of the assemblies shown in FIG. 34, and showing a step in the removal of the wire guide and clamping assembly from the rotator assembly.
FIGS. 36 and 37 are enlarged fragmentary perspective views that illustrate sequences of steps in the removal of the wire guide and tooling assembly.

In preparation for winding the coils and during the winding cycle, the armature 20 must be rotated as necessary to properly align its coil-receiving slots 34 with the winding forms 62 and 64 and to enable appropriate connections to the commutator slots 30 to be made. Therefore, the collet assembly 86 forms part of an armature rotator assembly, generally designated 92 in FIG. 28, which is used to rotate the collet assembly 86, and thereby the armature clamped thereby, as needed during the operation of the winding machine 60. The rotator assembly 92 may be essentially conventional. Briefly, it includes a frame 94 having a base plate 96 adapted to be mounted on the main frame (not shown) of the armature winder 60. A drive motor 98, which is preferably a servomotor, is mounted on the rear of the frame 94 and drives, by means of gears 100, a horizontally-oriented, hollow rotator spindle 102, only a small portion of which can be seen in FIG. 28. The collet assembly 86, which is shown in FIG. 28 to comprise a collet 103 lodged between a tubular collet retainer 104 and a tubular collet actuator 106 to which a collet compression or release rod 110 is threadedly attached and welded. When the collet assembly 86 is assembled in the rotator spindle 102, a set of spring washers 112 slidably mounted on the collet release rod 110 is confined between the rear face of the collet actuator 106 and a shoulder (not shown) inside the spindle 102. The spring washers 112 thereby press the collet actuator 106 into engagement with the collet 103, forcing it against a shoulder (not shown) on the inside of the collet retainer 104, causing the collet 103 to grip the shaft of the armature being wound. The clamping pressure of the collet 103 is released upon actuation of a collet-release cylinder 114, which causes a drive lever 115 to press rearwardly against a force transmitting fitting 116 that is slidably mounted on the rear portion of the collet release rod 110 which engages a split collar 118 which is threadedly mounted on the extreme rearward end of the collet release rod 110. In a manner similar to that described in said U.S. Pat. No. 4,915,313, the collet assembly 86 may be removed by removing a c-clip 119 that extends into aligned notches in the rotator spindle 102 and the collet retainer 104 and by unthreading the collar 118 from the rear end of the collet release rod 110. Although the illustrated armature rotator assembly 92 is preferred, other forms of armature rotator assemblies may be used instead. For example, the armature rotator assemblies shown in said Banner Pat. No. 4,633,577 and in said Banner et al U.S. Pat. No. 4,915,313 could readily be modified for use with the present invention.

Figure 2:
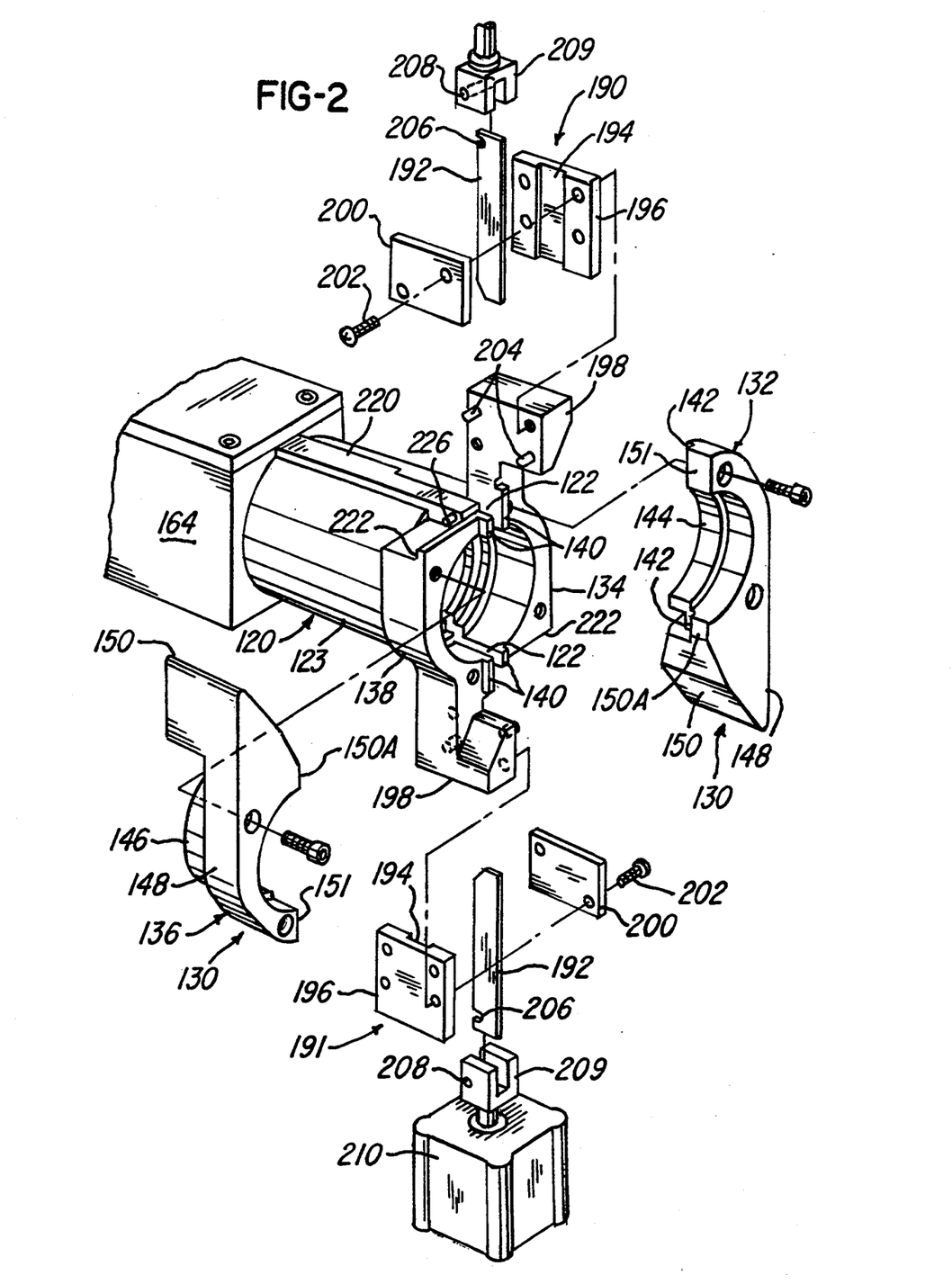
FIG. 2 is a fragmentary, partly exploded perspective view of a portion of the armature winding machine of FIG. 1.

Referring now to FIGS. 1 and 2, the armature winding machine 60 further includes a commutator shield or wire guide and clamping assembly 120 that surrounds the commutator 24 and has a pair of opposed, slot-exposing notches or slots 122 in its forward end, i.e., the end closest to the winding forms 62 and 64. The purpose of the shield notches or slots 122 is to expose two diametrically opposed commutator bar slots 30 located in positions wherein coil leads can be connected to them. In the machine 60, these particular commutator bar slots 30 are located in the generally vertical plane, at positions which are referred to as the "12:00 o'clock" and the "6:00 o'clock" positions, when coil lead wire connections are to be made thereto. The wire guide and clamping assembly 120 comprises a non-rotatable, hollow, generally cylindrical body member 123 on which is mounted wire guide tooling, generally designated 130, which defines the shield notches or slots 122 and which is used to guide lead wire segments into the shield notches or slots 122 and thereby into the commutator bar slots 30 exposed thereby. For this purpose, the wire guide tooling 130 comprises a right side wire guide member 132 (as viewed in FIG. 2), a right side support block 134 for the right side guide member 132, a left side wire guide member 136 and a left side support block 138 therefor. For rigidity, the support blocks 134 and 138 are preferably formed in one piece with the hollow body member 123 and, for accuracy of alignment, have locating protrusions 140 that interfit with mating recesses 142 on the wire guide members 132 and 136.

The guide members 132 and 136 are so designed that they cam the magnet wires W to the outer sides of the wire guide and clamping assembly 120 when the fliers are rotating in a "forward" direction to wind coils, but intersect the magnet wire portions leading from the fliers during reverse rotation of the fliers so that these wire portions are aligned with the guide notches or slots 122.

The right side wire guide member 132 has a semi-circular hub portion 144 that fits inside the end of the hollow body member 123 and cooperates with a similar hub portion 146 to locate the commutator within the assembly 120. The right side wire guide member 132 has an outer guide surface 148 which cams or guides the wire exiting from the flier away from the tooling area when the right side flier 76 is rotating to wind coils. It also has an inner guide surface 150 over which the wire passes when coil connections are being made, as will be further discussed below. The uppermost end, designated 150A, of the inner wire guide surface 150 is vertical and cooperates with a flat vertical surface 151 on the confronting left side wire guide member 136 to form the notch or slot 122 located at 6:00 o'clock. The left side guide member 136 is identical to the right side guide member 132 (and like reference numbers are applied thereto), but rotated through 180 degrees therefrom. Accordingly, the notch or slot 122 at the 12:00 o'clock position is also formed between two vertical surfaces 150A and 151 by the two wire guide members 132 and 136. An advantage of this construction is that the guide members 132 and 136 are readily replaceable so that it is a simple task to retool for armatures having different diameters, or to accommodate wires of different diameters—simply by replacing the two wire guide members 132 and 136. An advantage with this construction is that the wires exiting from the fliers engage only against the outside surfaces 148 of the wire guide members 132 and 136 which, because each is a one piece construction, are readily machined to be smooth and not damage the wire.

Figures 30, 31, 32:
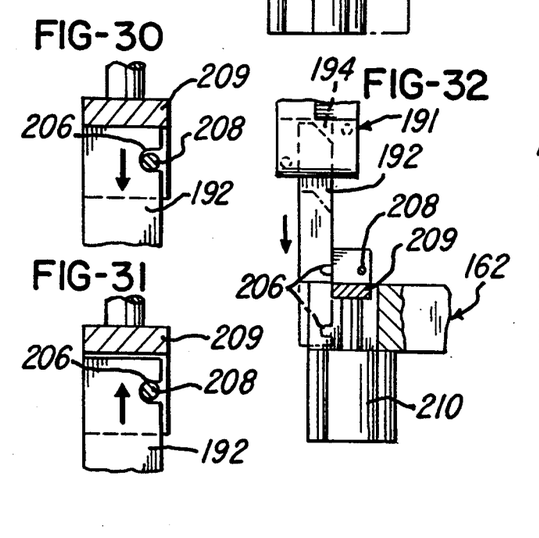
FIGS. 30 and 31 are fragmentary cross-sectional views showing the manner in which a tamper blade may be moved, respectively, toward and away from tamping engagement with a lead wire.
FIGS. 32 and 33 are fragmentary views, partly in cross section and partly in elevation, that illustrate sequences of steps for removing a tamper blade.

A pair of wire tamping assemblies, generally designated 190 and 191, are provided for pushing wire segments through the shield notches or slots 122 and wedging the wire segments into the commutator bar slots 30. Tamping assembly 191 is identical to tamping assembly 190 and like reference numbers are applied thereto. The right side tamping assembly 190 includes a tamping blade 192 preferably made from spring steel which is vertically slidable within a guide channel 194 in a mounting plate 196 affixed to a vertical face of a right side tamping assembly support member 198 that is integrally formed with and projects upwardly from the right side support block 134. A cover plate 200 holds the tamping blade 192 in the guide channel 194, and the entire tamping assembly 190 is mounted by screws 202 on the right side tamping assembly support member 198 and accurately vertically aligned by alignment pins 204. The tamping blade 192 has a notch 206 engaged by a clevis pin 208 mounted in a clevis 209 connected to an air actuator 210 which is used to vertically drive the tamping blade 192 as needed to tamp wire segments into the commutator bar slots 30. As illustrated in FIGS. 30 and 31, the clevis pins 208 are preferably spaced sufficiently far from the confronting faces of the clevises 209 that the tamping blades 192 can move vertically through a short distance relative thereto. Accordingly, as shown in FIG. 30, when the air actuators 210 are operated to tamp wires into commutator bar slots, the confronting faces of the clevises 209, which engage over the entire end faces of the tamping blades 192, drivingly engage the tamping blades 192. The manner in which the upper tamping blade 192 is driven downwardly by the downwardly facing surface of the upper clevis 209 is illustrated in FIG. 30. The lower tamping blade 192 would similarly be engaged by the upwardly facing surface of the lower clevis 209. This avoids the high concentrations of stress which could occur if the clevis pins 208 were used to drive the tamping blades 192 during a tamping operation. As shown in FIG. 31, the upper tamping blade 192 will be lifted by the clevis pin 208 following each tamping operation, but the force applied to the tamping blade 192 at this time is small in comparison to the forces applied during a tamping operation.

Figure 29:
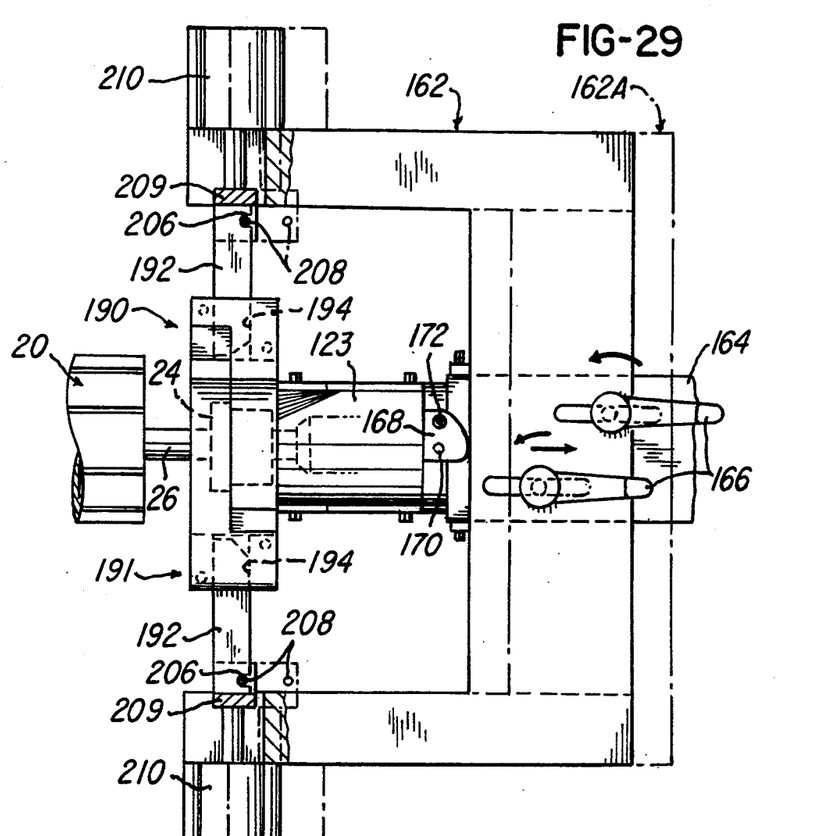
FIG. 29 is a side elevational view, with parts broken away and parts shown in cross section of a portion of the rotator and the wire guide and clamping assemblies of FIG. 28 and illustrates the mounting of the tamper blades in accordance with this invention.
Figure 33:
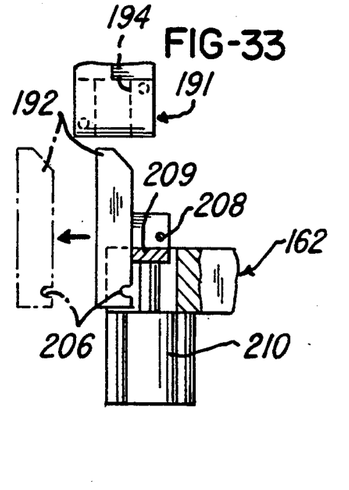

With reference to FIGS. 28 through 33, the air actuators 210 for the tamping assemblies 190 and 191 are mounted on the top and bottom legs, respectively, of a C-shaped mounting frame 162 which is releasably clamped to one side of a tooling mounting block 164 by a pair of manually releasable clamps 166. Each clamp 166 can be of the type known as a stud type clamp with an adjustable handle which is available from Kipp-Elesa Division of Monroe Engineering Products, Birmingham, Michigan. By loosening the clamps 166, the mounting frame 162 can be retracted away from the winding area to the position indicated by the phantom lines 162A in FIG. 29, whereupon the clevis pins 208 are moved out of the notches 206. Once the clevis pins 208 are removed from the notches 206, the upper tamping blade 192 will fall further into its guide channel 194 and, as illustrated in FIGS. 32 and 33, the lower tamping blade 192 will fall downwardly onto its drive actuator 210. Thus, the tamping blades 192 can be quickly removed for repair and replacement without the use of tools. To mount new or refurbished tamping blades 192, they are temporarily held in their positions shown in full lines in FIG. 29, and the mounting frame 162 moved back toward the winding area into its full line position shown in FIG. 29, whereupon the clevis pins 208 are again received in the tamping blade notches 206. A stop plate 168 shown in FIG. 29 is preferably mounted, as by a dowel pin 170 and a screw 172, to the shield body member 123, to enable the mounting frame 162 to be rapidly located in its operative position when it is advanced toward the winding area.

Figure 34:
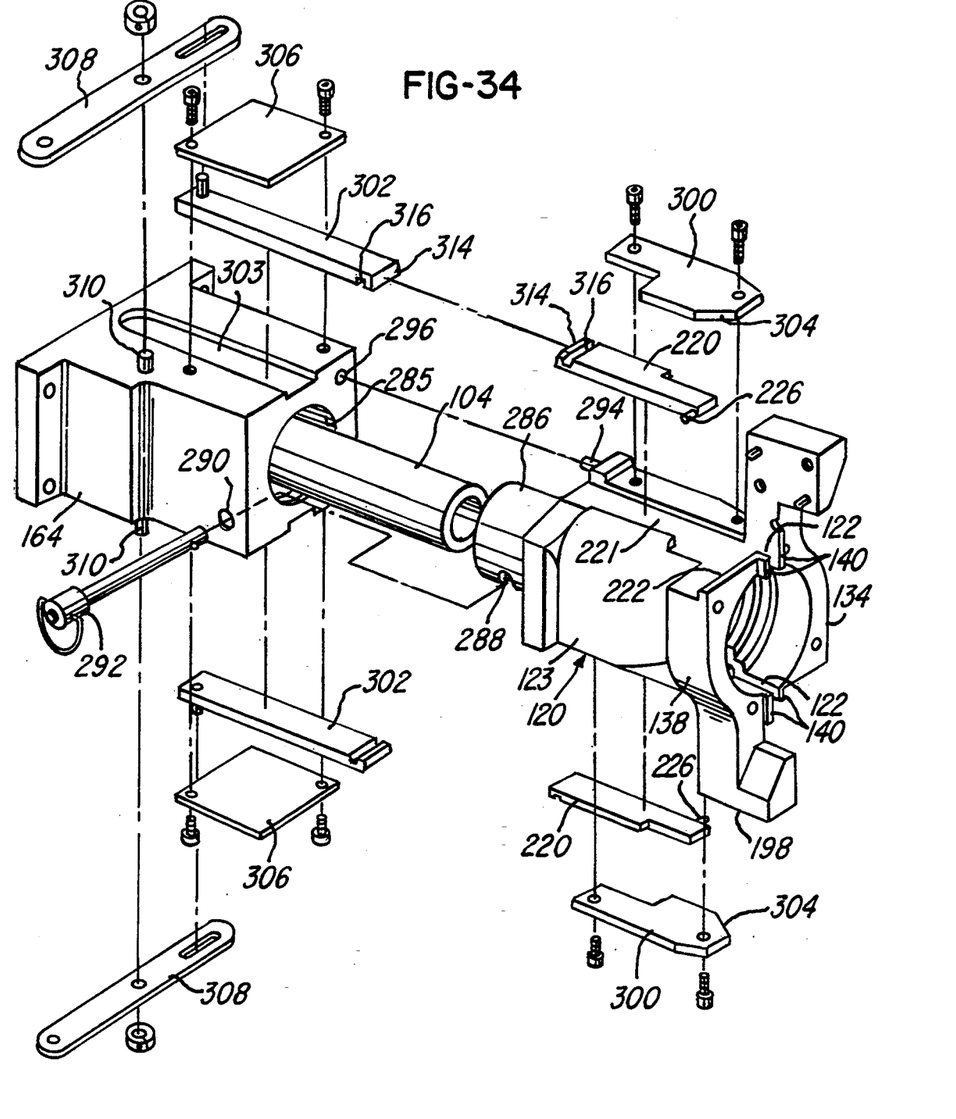
FIG. 34 is an exploded perspective view of a portion of the rotator and wire guide and clamping assemblies of FIG. 28.

With reference to FIGS. 1, 2, 4 through 9, and 18 through 22, the machine 60 is provided with a pair of wire clamp rods 220 which are horizontally slidable in grooves 221 that extend along the top and bottom surfaces of the commutator shield body member 123. The forward ends of the clamp rods 220 are adapted to clamp or pinch the ends of the wires W to the confronting vertical flanges 222 extending, respectively, upwardly and downwardly from the wire guide support blocks 134 and 138. The surfaces of flanges 222 against which the wires are pinched are located in a vertical plane behind but close to the rearward edge of the commutator riser 32. (As is evident, only the uppermost clamp rod 220 and its associated flange 222 are illustrated in the partly diagrammatic FIGS. 1, 2, 4 through 9, and 18 through 22. As best illustrated in FIG. 2 and 34, the location of the corresponding lower rod 220 and flange 222 are identical—just reversed by 180 degrees.) In operation, a pair of air actuators, one of which is schematically illustrated at 224 in FIGS. 1 and 18, drive the clamp rods 220 toward and away from the vertical surfaces 222 as needed during the operation of the machine 60 for clamping the wire segments leading to the fliers at the beginning and the end of the winding of each armature. For reasons which will become apparent, the clamp rods 220 have transversely extending pins or fingers 226 at their forward ends which extend into the path of the wire leading to the flier at the beginning of the winding of an unwound armature.

In the operation of this invention, the start and finish wires are trimmed or severed closely adjacent to their associated commutator slots 30 as will now be described. It is convenient to start at the end of the winding of the armature 20 as shown in FIG. 18. At this time, all of the coils of wire have been wound and the lead wires between sequentially wound armatures wedged into the proper commutator bar slots 30. The flier 70, which rotates in a clockwise direction as viewed in FIG. 18 to wind coils, has been stopped at a "normal stop" position shown in phantom lines in FIG. 18. The flier 70 is then reversely rotated to a position, called the "reverse stop" position, to cause the finish wire, designated 230, leading from the last coil wound by the flier to enter into the upper wire guide notch or slot 122. The tamping blade 192 is then operated, as shown in FIGS.

Figures 19, 20, 21, 22, 23:
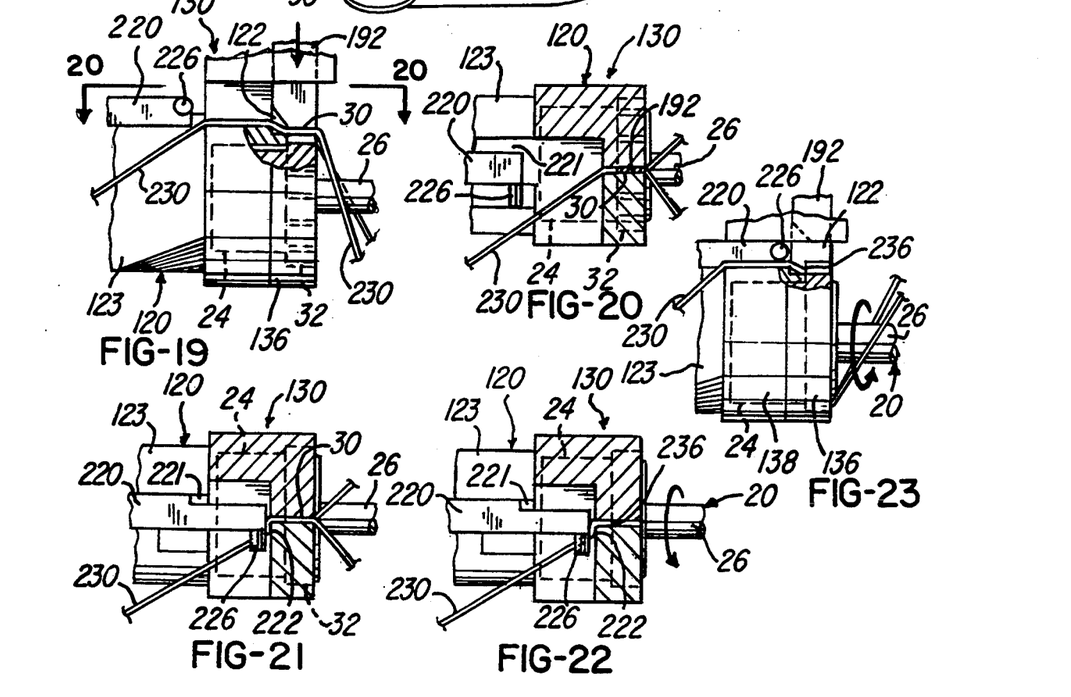
FIG. 19 is a fragmentary side elevational view of the machine of FIG. 1 illustrating the tamping of a finish wire into a commutator bar slot.
FIG. 20 is a fragmentary cross sectional view taken along line 20—20 of FIG. 19, at the same time during the sequence of operation as FIG. 19.
FIGS. 21 and 22 are views similar to FIG. 20 but illustrating subsequent steps in the operating sequence.
FIG. 23 is a fragmentary side elevational view of the parts of the machine of FIG. 1 illustrating the indexing of the armature to sever the finish wire. This is the same position illustrated in FIG. 22.

19 and 20, to force a segment of the finish wire 230 into the bar slot 30 at the 12:00 o'clock position. (Most of the wire segments forming the wound coils and the lead wires associated therewith are not shown in FIGS. 19 through 23 in order to avoid a confusion of lines.) The upper clamp rod 220 is then advanced, as shown in FIG. 21, to pinch a portion of the finish wire 230 against the rear face of the vertical flange 222. This portion extends from the rear edge of the commutator slot 30 radially outwardly a short distance to the outside of the assembly 120. Advantageously, the corner of the clamp rod 220 that pinches the clamped wire segment has a radius so that it will not tend to sever the clamped wire segment. As diagrammatically illustrated in FIGS. 22 and 23, it is then a simple matter to rotate the armature 20 while maintaining the wire extended to the flier clamped against the vertical flange 222. As a consequence of such armature rotation, the finish wire 230 is stretched and severed at the rear of the riser 32 at an edge of the commutator which defines the commutator slot 30 in which the finish wire 230 is wedged. The point at which the finish wire 230 is severed is indicated at 236 in FIG. 23.

Following the severing of the finish wire, the wound armature is removed from the winding machine and replaced by the next unwound armature 20 to be wound, all the while maintaining the flier 70 at its reverse stop position and the wire leading to the flier 70 clamped against the vertical flange 222.

Figure 7:
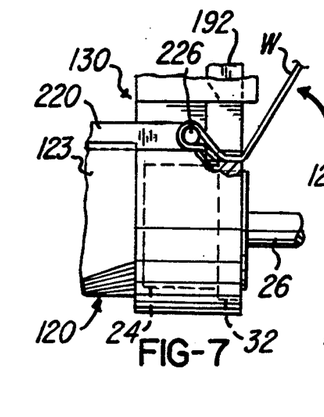
Figures 8, 9:
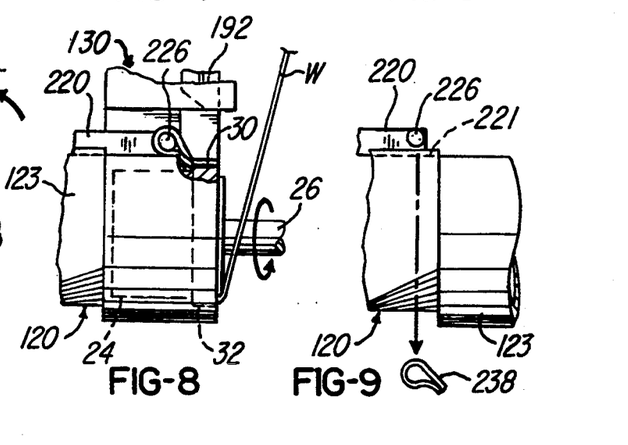

With reference now to FIGS. 1 and 4 through 9, the newly loaded unwound armature is indexed, as conventional, to appropriately align a commutator slot 30 with the wire guide tooling notch or slot 122, and the flier 70 rotated in the forward direction to a position, called an "override stop" position, at which the flier 70 is forward of the wire guide tooling 130 and rotated past its "normal stop" position to a position partly over the armature core 22. The flier 70 is not shown in this position but the segment of wire W leading from the clamp finger 226 in FIG. 4 extends to the flier 70 in the "override stop" position. As shown in FIGS. 4 and 5, this forward rotation of the flier 70 from its reverse stop position causes the segment of wire between the clamped end thereof and the flier to be passed through the upper guide notch or slot 122 in alignment with the commutator bar slot 30 now located at the 12:00 o'clock position. Immediately thereafter, the flier 70 may be reversely rotated by a few degrees so that the following tamping step will not cause the start wire to engage the aramature core. The wire is then tamped into the latter commutator slot 30, as shown in FIG. 6, by a downward movement of the tamping blade 192. Here it will be observed that the clamped end of the wire is now completely looped around the clamp rod finger 226. The flier 70 is then reversely rotated to its "normal stop" position in which it is so located that the segment of wire W extending from the commutator to it, which is shown in FIG. 7, will not interfere with the rotary motion of the armature. The armature is now rotated as shown in FIG. 8, causing the wire segment looped around the clamp finger to be severed in the same manner the finish wire 230 was severed. The winding of the unwound armature 20 is now commenced. At a convenient later stage in the winding of the armature, the clamp rod 220 is retracted as shown in FIG. 7, whereupon the remnant loop of wire, designated 238, will bear against parts of the machine and fall off the clamp finger 226 for disposal. Those familiar with armature winding machines and methods will be aware that many different armature configurations are encountered, some of which may require steps and degrees of armature rotation somewhat different from those described above.

Although the foregoing description of the operation has not mentioned the finish wire generated by the right side flier 76, those familiar with the art will appreciate that the same operations are occurring in relation to the wire exiting from the right side flier as are described above with respect to the wire exiting from the left side flier 70.

Using the foregoing method and apparatus of this invention, minimal time is required to effect the commutator connections and the severing of the start and finish wires. The severed wires do not require further trimming and only a minimal amount of wire is wasted for the operations that occur between the winding of successively-wound armatures.

Before further description of the operation, a discussion of the manner in which the magnet wire is supplied to the fliers would be helpful. FIG. 3 illustrates, somewhat diagrammatically, wire W being despooled from a supply spool 240, coursed through one form of a wire tensioning and take-up assembly, generally designated 242, and around a guide pulley 244 into a flier spindle 68. The wire tensioning and take-up assembly 242 comprises a tensioning pulley 246 connected to a magnetic brake 248 by which variable tension can be applied to the wire to increase or decrease the resistance to rotation of the tensioning pulley 246 and thereby the tension on the wire W. The wire W may be wrapped several times around the tensioning pulley 246 against which it is held by a spring-biased roller 250, then coursed over a guide pulley 252 and under a dancer arm pulley 254, from which the wire goes to the aforementioned guide pulley 244. In the arrangement illustrated in FIG. 3, the dancer arm pulley 254 is at the free end of a dancer arm 256 which is freely pivotally mounted on the same shaft as the tensioning pulley 246. The dancer arm 256 is pulled downwardly by a pair of elongate coil springs 258 and 260. The coil spring 260 is connected to the piston of an air cylinder 262, which can be operated to rapidly increase or decrease the force tending to pull down on the dancer arm pulley 254. The operation of tensioning and take-up assemblies such as assembly 242 are well understood by those familiar with the art and will not be described in detail herein. It suffices to note at this point that the tension applied by the brake 248 is changed at different stages of the operation of an armature winding machine, and to note that the dancer arm arrangement is provided to take up slack wire conditions, such as are created when the flier reversely rotates.

Figures 10, 11:
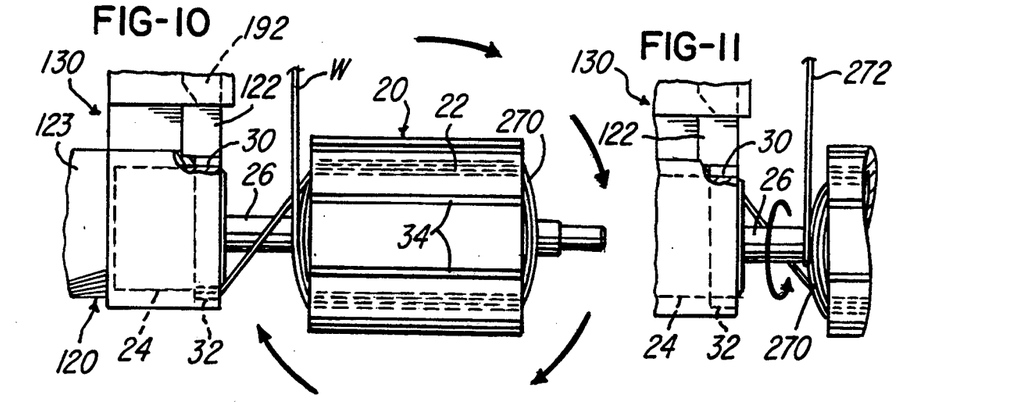
FIG. 10 is a fragmentary, side elevational view of the machine and an armature being wound and illustrating the winding of a first coil in a pair of armature core slots.
FIGS. 11 through 16 are fragmentary, side elevational views similar to FIG. 10, but showing only a fragment of the armature core, and illustrating in sequence the steps taken to connect the wire leads to a commutator bar slot between the winding of the first and second coils wound by the same flier.
Figure 12:
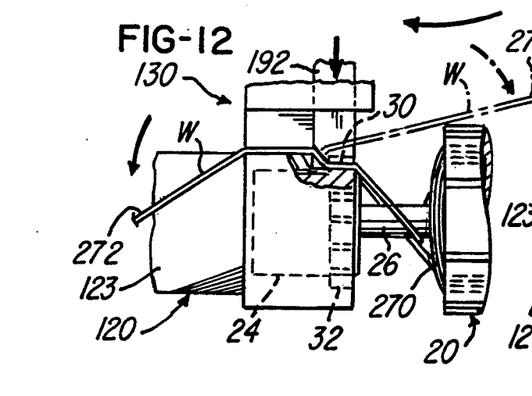

FIGS. 10 through 17 illustrate the forming of lead wire connections to the commutator 24 between successively-wound coils of an armature 20. In FIG. 10, an unwound armature 20 has been rotated after connection of a start wire to a position in which the armature core 22 is positioned to have coils of wire wound therein, and the first coil, designated 270, has been wound by rotation of the flier 70 in its forward direction, which is clockwise in this case as indicated by the arrows in FIG. 10, and the rotation of the flier 70 stopped at its normal forward stop position. This is a position at which the armature 20 can be rotated or indexed about its axis, which is done as illustrated in FIG. 11 to reposition the armature 20 so that the commutator bar slot 30 to receive the finish wire leading from the first coil 270 as indicated in FIG. 11. The flier 70 is then reversely rotated to a reverse stop position illustrated in FIG. 12 and the finish wire 272 tamped into the commutator bar slot 30 aligned with the tamping blade 192 by extension of the blade 192. With the tamping blade 192 still extended, the flier 70 is rotated in a forward direction to the full line position thereof shown in FIG. 13, past its normal stop position to a position which can be called an "override stop". This rotation of the flier 70 causes the wire, under the guidance of the wire guide tooling 130, to be bent or folded over on top of itself so that the wire segment leading to the flier 70 from the far side of the riser 32, which will become the start wire of the next coil wound by the same flier 70, will enter the guide tooling notch or slot 122. This also causes the formation of a loop 276 in the wire W on the far side of the commutator riser 32. The tamping blade 192 remains extended during this forward rotation of the flier 70 to avoid having such forward rotation cause the newly-tamped wire segment from being pulled out of its commutator bar slot 30. After the flier 70 reaches the override stop position, the tamping blade 192 is retracted. At the same time, the tension setting of the magnetic brake 248 is lowered. As those familiar with magnetic brakes are aware, a reduction in a tension setting on the brake 248 will not take effect until shortly after the tensioning pulley 246 next begins to rotate. To accommodate for this situation, the air actuator 262 associated with the dancer arm spring 260 is released to reduce the pressure acting on the wire, again to insure that the tamped finish wire 272 will not be pulled out of its commutator bar slot 30.

Figure 13:
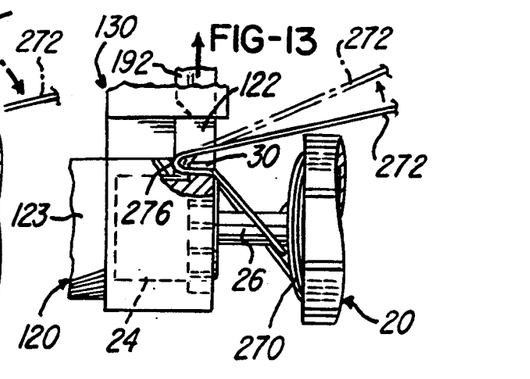
Figures 14, 15:
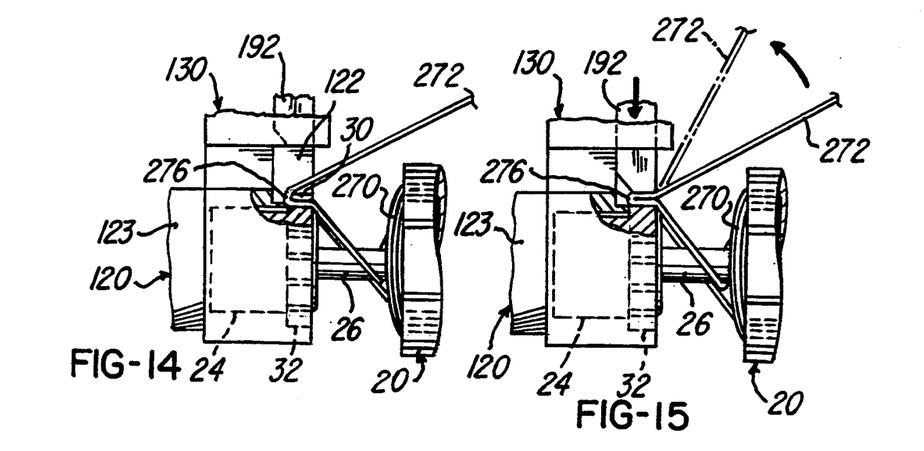
Figure 16:
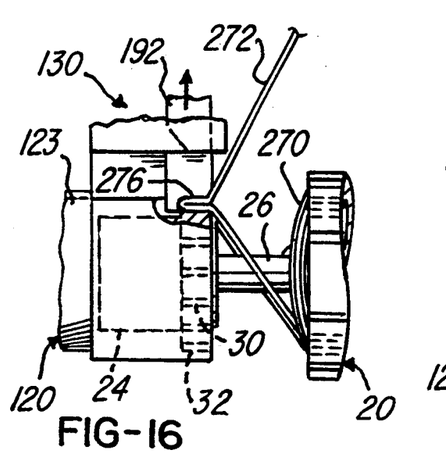
Figure 17:
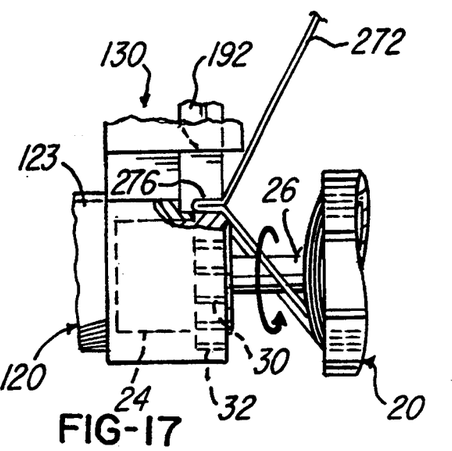
FIG. 17 is a fragmentary, side elevation view similar to FIGS. 11 through 16 but illustrating a step taken to locate the armature in preparation for the winding of the second coil by the same flier.

The size of the wire loop 276 can be substantially reduced following the retraction of the tamping blade 192 by a short reverse motion of the flier 70, as indicated by the phantom line position of the wire in FIG. 13. At the onset of this reverse rotation, a slack wire condition is momentarily created, causing the dancer arm 256 of FIG. 3 to begin to pull out the slack. The reverse flier rotation is then quickly halted at an intermediate stop position so that the momentum of the dancer arm 256 pulls the wire backward through the flier 70 and reduces the size of the wire loop 276 as illustrated in FIG. 14. After reaching the intermediate stop position, the tamping mechanism 190 operates to tamp the second segment into the same slot as shown in FIG. 15. The flier 70 can then be rotated to its normal stop position and the tamping blade 192 retracted as shown in FIG. 16 and the armature indexed in preparation for the winding of the next coil as shown in FIG. 17.

Those familiar with the art will be aware that there may be occasions in which the fliers should be stopped at positions other than those indicated by the wire positions in FIGS. 10 through 17. For example, it may be useful in some circumstances to stop the flier between its reverse stop position and its normal stop position at the completion of the winding of the coil so that the finish wire 272 is held to the outside of the wire guide assembly 130. This may useful if the armature 20 is to undergo an index through a substantial angle in a direction which may cause the last turn of the just wound coil to be drawn out of its armature core slot.

Figure 24:
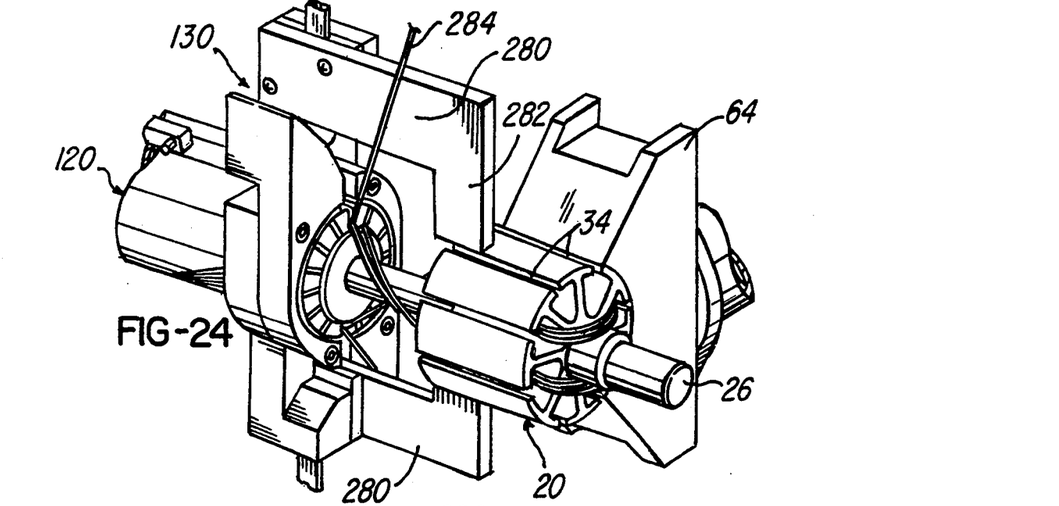
Figure 25:
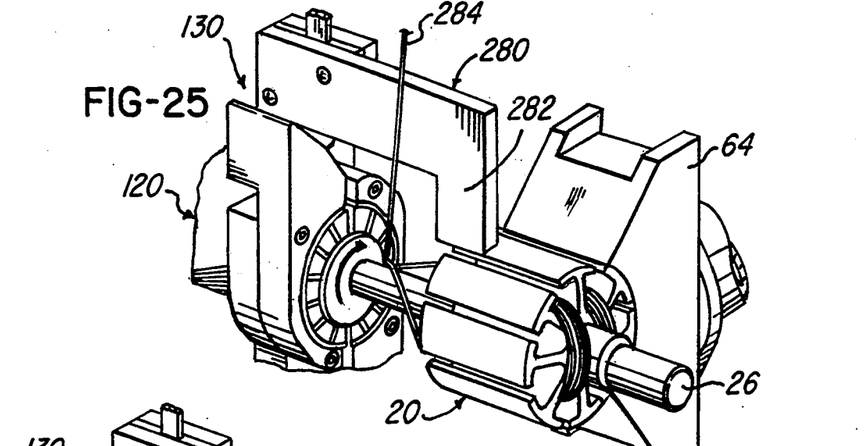
FIG. 25 is a fragmentary perspective view similar to FIG. 24 but illustrating the parts after the armature has been rotated to position the armature in position to have a second pair of coils wound therein.
Figure 26:
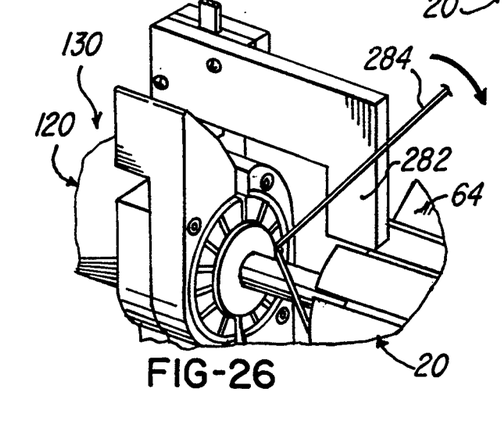
FIG. 26 is fragmentary perspective view of a portion of the machine and the armature of FIGS. 24 and 25 illustrating the movement of a wire segment at the commencement of the winding of a second coil.
Figure 27:
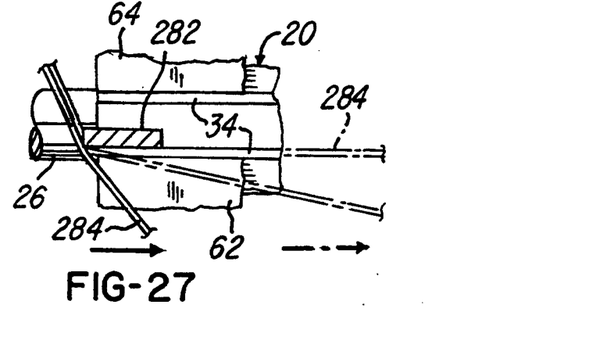
FIG. 27 is a fragmentary plan view of parts of the machine of FIG. 24 illustrating the guiding of the wire segment into an armature core slot. This is at the same time in the operating sequence illustrated in FIG. 26.

FIGS. 24 through 27 show a modification in which a "swing lead" is formed first by a rotation of the armature 20 through a substantial angle in one direction to locate a commutator slot 30 in position for the commutator connections to be made, as shown in FIG. 24, and then by rotation of the armature 20 in a reverse direction as shown in FIG. 25 to position the armature to have coils wound in a pair of armature core slots. In this modification, the tamping assembly cover plate 200 of the first embodiment is replaced by an L-shaped cover plate 280, having a shorter, vertical leg 282 overlying the armature core 22. The shorter leg 282 acts as a center wire guide for guiding the start wire 284 at the beginning of the winding of the next coil, as shown in FIGS. 26 and 27.

As mentioned above, the construction of wire guide and clamping assembly 120 enables one to simply retool for armatures having different parameters simply be replacing the two wire guide members 132 and 136. The tamping blades 192 may also need to be replaced, but this task can also be quickly accomplished. Further in accordance with this invention, an entire wire guide and clamping assembly 120 constructed for use in winding armatures having one set of parameters may be removed as a complete unit without disassembly of its parts and replaced by another complete wire guide and clamping assembly (not shown) which is constructed for use in winding armature having different parameters.

With reference to FIGS. 28 and 34, the tooling mounting block 164, which is mounted on the front of the rotator frame 94, has a through bore 285 concentric with and partly surrounding the collet assembly 86 so that the collet retainer 104 projects completely therethrough. The cylindrical body member 123 of the wire guide and clamping assembly 120 has a rearwardly extending hub portion 286 that is slidable over the forward end of the collet retainer 104 and into (and out of) the through bore 285 of the tooling mounting block 164. When the wire guide and clamping assembly 120 is located in operative position, a transversely extending notch 288 in its hub portion 286 is aligned with a bore 290 in the mounting block 164 so that a transverse key 292 can be inserted through the bore 290 in engagement with the transverse notch 288. The transverse key 292 preferably comprises a quick release ball lock pin, which is available from Reed Tool Supply company of Muskegan, Mich., so that the key can be inserted and removed by hand without the use of tools. Proper angular orientation of the wire guide and clamping assembly 120 relative to the mounting block 164 is assured by means of an alignment pin 294 that projects from the rearwardly facing shoulder on the wire guide and clamping assembly 120 into a guide bore 296 in the confronting face of the mounting block 164. In view of the foregoing construction, the wire guide and clamping assembly 120 is effectively piloted on the collet assembly 104, held against axial movements by the transverse key 292, and held in the desired angular alignment by the interfitting pin 294 and bore 296.

The driving connection between the clamp rods 220 and their air actuators 224 is shown schematically or simplified in FIGS. 1, 2, 4 through 9, and 18 through 24. In practice, the clamp rods 220 can be directly driven by the provision of a suitable linkage between the actuators 224 and the rods 220. However, the construction shown in FIGS. 28 and 34 through 37 is preferred. As shown therein, the clamp rods 220 are slidably mounted in upper and lower grooves 221 in the wire guide and clamping tooling assembly body member 123 and held in the grooves 221 by retaining plates 300. (The forward ends of the retaining plates 300 are provided with sloping or cam surfaces 304 which engage the remnant wire loops 238 as the clamp rods 220 are retracted, thereby stripping the wire loops 238 off the pins or fingers 226.)

In order to drive the clamp rods 220 toward and away from the vertical clamping flanges 222, yet permit removal of the clamp rods 220 with the rest of the wire guide and clamping assembly 120, the clamp rods 220 are connected to drive rods 302 slidably mounted within grooves 303 in the upper and lower surfaces of the mounting block 164, and held therein by retaining plates 306. The drive rods 302 are driven toward and away from the winding area by means of drive levers 308 pivoted on pivot pins 310 projecting, respectively, upwardly and downwardly from the mounting block. Drive levers in turn are driven by air actuators 312 mounted on the rotator frame 94. Actuators 312 serve the same purpose as the aforementioned actuators 224.

The clamp rods 220 and the drive rods 302 are interconnected by transversely-extending tongues 314 and grooves 316. With reference to FIGS. 35 through 37, this construction enables one to remove the wire guide and clamping assembly 120 by the simple steps of (1) removing the transverse key 292, (2) pulling the wire guide and clamping assembly 120 sufficiently far from the mounting block 164 that the alignment pin 294 is removed from the bore 296 and the clevis pins 208 are retracted from the tamping blade notches 206, (3) rotating the wire guide and clamping assembly 120 as shown in FIG. 35 to disengage the clamp rods 220 from the drive rods 302 (as can be understood from a comparison of FIG. 37 with FIG. 36), and (4) sliding the wire guide and clamping assembly 120 completely off the collet assembly 86. These steps can all be accomplished in a few seconds without the use of tools. The steps are simply reversed in order to mount a new wire guide and clamping assembly 120 on the mounting block 164, and can also be accomplished in a few seconds, again without the use of tools.

Although the operation of only one flier has been described herein, it is to be understood that the other flier will usually operate in the same manner as the described flier.

Although the presently preferred embodiment of this invention has been described, it will be understood that within the purview of the invention various changes may be made within the scope of the following claims.

I claim:

1. In a method of machine winding an armature of the type having a commutator with commutator bars having lead-receiving slots utilizing an armature winding machine having a rotatable flier, a flier drive, and wire guide tooling, said flier drive being capable of rotating said flier in a forward direction to wind coils and positioning said flier at different forward stop positions and also being capable of rotating said flier in a reverse direction to at least one reverse stop position, said tooling having first wire guide surfaces for camming wire being wound into coils away from the commutator when said flier is rotating in the forward direction to wind a coil and second wire guide surfaces for directing the wire into a commutator slot when said flier is rotated in the reverse direction, the steps of:

with the flier located in said reverse stop position, clamping the wire segment extending from the flier against said tooling by moving a linearly movable clamp rod which clamps said wire segment by pressing said wire segment against said tooling so that said wire segment is pinched between the tooling and said clamp rod, said clamp rod having a wire-loop receiving finger extending into the path taken by the wire upon forward rotation of said flier from said reverse stop position when said wire segment is clamped to said tooling, locating an armature in the winding machine with a first one of said lead-receiving slots in position to receive a start wire guided by said second surface portions upon forward rotation of said flier from said reverse stop position, rotating said flier in the forward direction to extend said wire segment around said finger and into alignment with said first slot;

wedging said wire segment into said first slot;

severing said wire segment at said first slot by rotating said armature to stretch said wire segment whereupon a remnant piece of wire is looped around said finger;

moving said clamp rod away from said tooling with said loop of wire carried by said finger; and camming said loop of wire off said finger while said clamp rod is being moved away from said tooling.

2. For use in an armature winding machine having a flier for forming coils into slots of an armature core and connecting coil leads into commutator bar slots formed in a commutator mounted on a common shaft with said core, a method of severing a finish wire projecting from a wound armature and a start wire leading toward the next armature to be wound comprising the steps of:

A. at the termination of the winding of the last coil by a flier in a wound armature, reversely rotating said flier to a reverse stop position to align said wire with said bar slot, B. wedging said wire into said slot, C. clamping the segment of said wire between said bar slot and said flier against a fixed surface by means of a linearly movable clamp rod having a finger extending into the path taken by the wire upon forward rotation of said flier from said reverse stop postion, D. rotating said armature while retaining clamping engagement of said wire to stretch and thereby sever said wire segment, E. removing said wound armature from the winding machine, F. inserting an unwound armature into the winding machine, G. rotating said flier to align the segment of wire leading from said flier with a commutator bar slot of said unwound armature and to loop of portion of said segment around said finger, H. wedging said wire into said last-mentioned bar slot, I. rotating said unwound armature while retaining clamping engagement of said wire to stretch and thereby sever said last mentioned wire segment, J. retracting said clamp rod with said loop of wire carried by said finger; and K. camming said loop of wire off said finger while said clamp rod is being retracted.

3. In an armature winding machine having a flier for forming coils into slots of an armature core and a tamping assembly for tamping coil leads into commutator bar slots formed in a commutator mounted on a common shaft with said core, the improvement wherein said tamping assembly comprises a tamping blade, means positioning said tamping blade in radial and axial alignment with a commutator bar slot and guiding said tamping blade for radial movement with respect to said commutator, drive means releasably engageable with said tamping blade for moving said tamping blade linearly toward and away from said bar slot, and means mounting said drive means for axial movement with respect to said tamping blade to disengage said drive methods from said tamping blade.

4. The improvement of claim 3 wherein said tamping blade has a notch along one of its edges, and wherein said means for moving said tamping blade comprises an air actuator having a piston rod and a clevis mounted on said piston rod, said clevis having a pin engaged in said notch which is disengaged from said slot when said drive means is moved away from said tamping blade.

5. In an armature winding machine having a flier for forming coils into slots of an armature core, an armature rotator assembly for rotating the armature as needed during a winding operation, and a wire guide and clamping assembly for guiding wire into said slots and for clamping the start and finish leads of an armature, the improvement wherein said wire guide and clamping assembly is slidably mounted on said armature rotator assembly, and wherein said wire guide and clamping assembly is connected to said armature rotator assembly by a connecting pin extending through aligned portions of said wire guide and clamping assembly and said armature rotating assembly, said connecting pin being manually removable and replaceable without the use of tools so that said wire guide and clamping assembly may be manually removed from said armature rotator assembly and reconnected thereto without the use of tools.

* * * * *

UNITED STATES PATENT AND TRADEMARK OFFICE
CERTIFICATE OF CORRECTION

PATENT NO. : 5,445,333
DATED : August 29, 1995
INVENTOR(S) : John W. Bradfute

It is certified that error appears in the above-indentified patent and that said Letters Patent is hereby corrected as shown below:

Column 17, line 5, change "methods" to --means--.

Signed and Sealed this

Twenty-sixth Day of October, 1999

Attest:

Q. TODD DICKINSON

Attesting Officer     Acting Commissioner of Patents and Trademarks